United States Patent [19]

Kull

[11] 3,992,954

[45] Nov. 23, 1976

[54] MOTION TRANSLATING MECHANISM FOR INDEXING AND ESCAPEMENT DRIVES

[76] Inventor: Leo Kull, 58 Westover Ave., West Caldwell, N.J. 07006

[22] Filed: June 2, 1975

[21] Appl. No.: 583,182

[52] U.S. Cl. ................................. 74/1.5; 74/142; 58/116 R
[51] Int. Cl.² .................. F16H 27/02; G04B 15/14
[58] Field of Search ............... 74/1.5, 142; 58/116 R

[56] References Cited
UNITED STATES PATENTS

| | | | |
|---|---|---|---|
| 2,900,021 | 8/1959 | Richtmyer et al. | 74/1.5 X |
| 2,907,167 | 10/1959 | Olsen | 58/116 R |
| 3,186,238 | 6/1965 | Archer et al. | 74/1.5 |

*Primary Examiner*—Allan D. Herrmann

[57] ABSTRACT

A mechanism with two moving parts to act as a 120° indexing or escapement drive using a rotating member and a pivoting arm which are shaped to act together with a closely defined geometric relationship. As an escapement, a wheel, provided with three acting points or pins, will have a 120° escapement motion for each oscillating cycle of a pivoting escapement arm. As an indexing drive, the same basic parts, aided by drive and backup means, will act in reverse: the oscillating pivoting arm is driving or indexing the wheel 120° per each oscillating cycle wherein the driven angle per each half cycle of oscillation could vary between an equal 60°–60° proportion and the other extreme of a 120°–0° proportion. The positive tie-in of the wheel and pivoting arm throughout the full oscillating cycle permits the use of the mechanism in either direction as an escapement or indexing drive or a combination of both.

16 Claims, 23 Drawing Figures

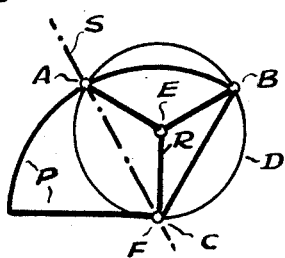
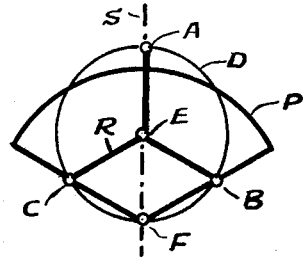
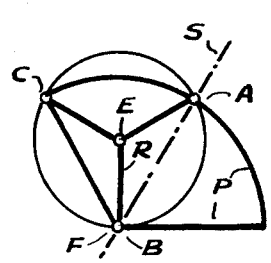
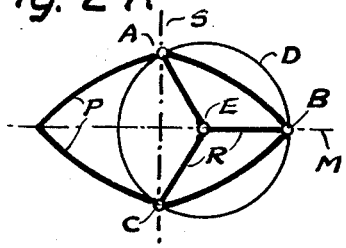
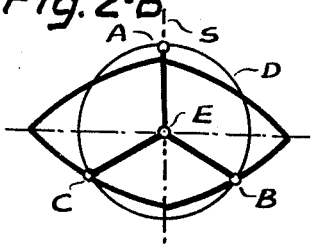
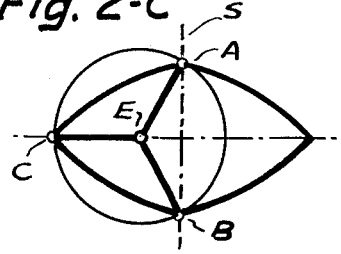
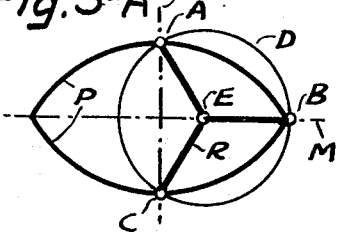
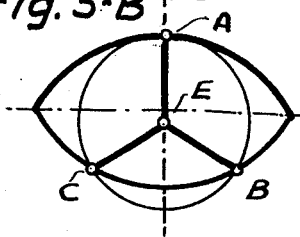
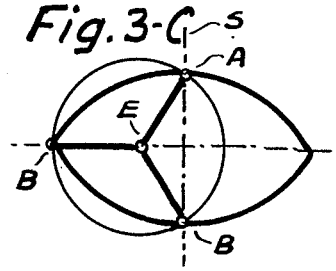
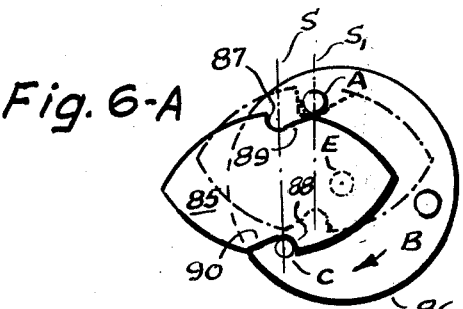
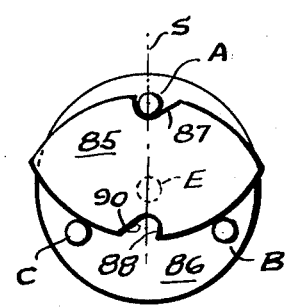
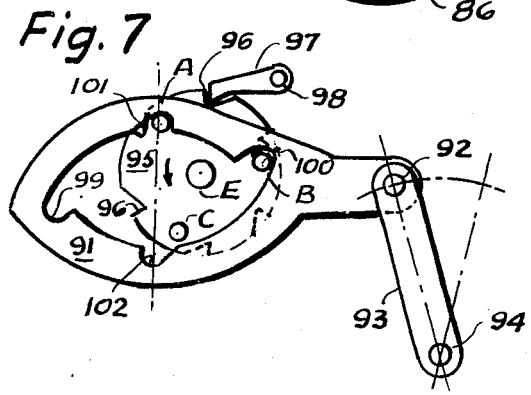
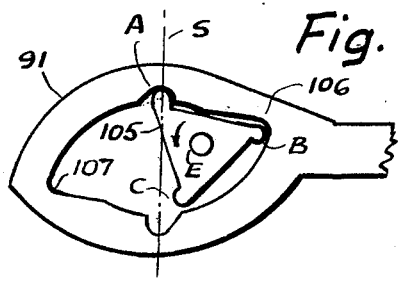

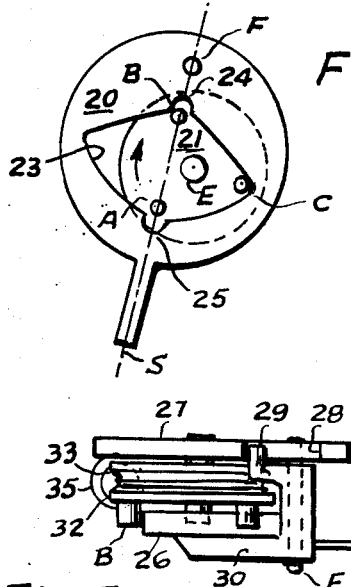
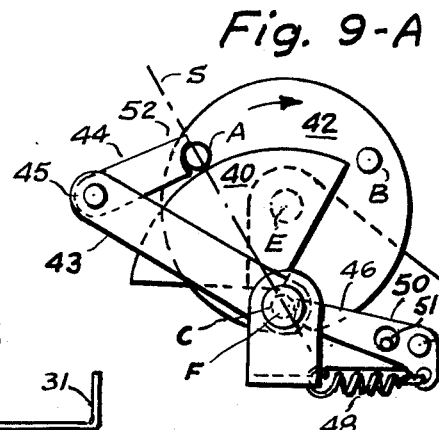
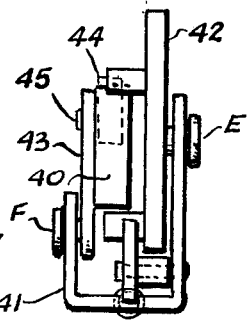
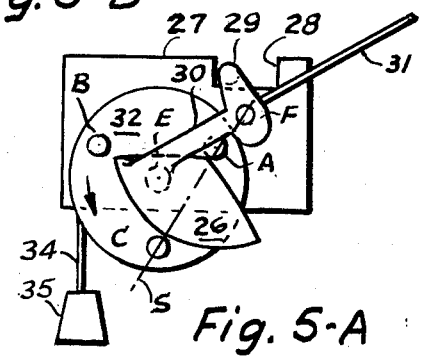
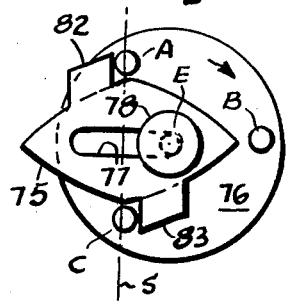
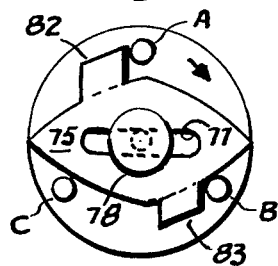
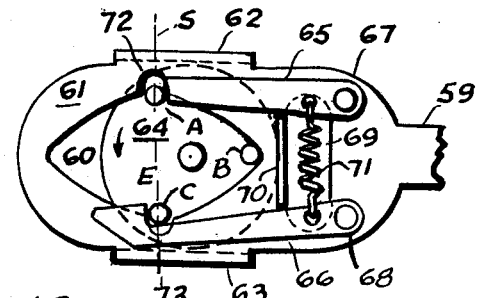
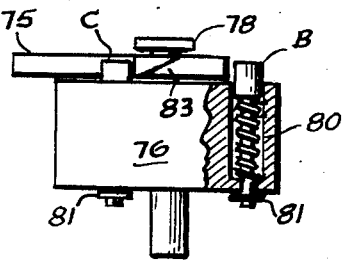
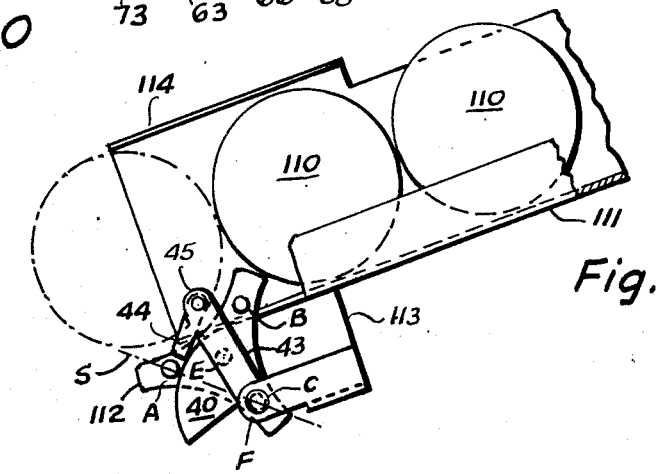

3,992,954

MOTION TRANSLATING MECHANISM FOR INDEXING AND ESCAPEMENT DRIVES

The rotating member could be in its most common form a wheel with three equally spaced pins concentric to the center of rotation. The pivoting member has a closely defined shape which is determined by the distance of the center of the wheel and center of the pivot arm. This basic arrangement offers a variety of practical combinations, shapes and characteristics which can be designed to suit a particular application.

The mechanism has a resemblance to the technology of a pair of spurgears. Both are working on two centers and have a driving and driven member for the purpose of transmitting power in a certain way. As becomes clear later, the terms like pitch line, external and internal shapes, the special case of a rack with an infinitely long radius, the ability to act bidirectionally, a different shape of gearteeth for a different number of teeth and finally the variety of sizes from a small fine mechanism to a large power drive: all are applicable here.

Since the scope of the invention is so wide, only the most characteristic basic arrangements are illustrated, each having at least one practical sample. Any available powersource such as a motor, solenoid, pneumatic or hydraulic actuators, manual operation etc. could be used for the indexing drives while the escapements are usually acting as incremental release means for a rotary stored energy source.

Thus the main object of the invention is to provide a basic new motion translation principle including a pivoting arm and a 120° rotating member acting as positive motion translating means for an indexing drive, an escapement or for a combination of both.

A further object is to provide two basic extreme arrangements and a special modified version of them.

Another object is to offer a series of most common practical applications including a dispenser drive which requires the combined characteristic of an indexing and escapement drive.

The basics and practical applications are illustrated and described in the following specification wherein some figure numbers have letter suffixes for different positions or views:

FIGS. 1 and 2, comprising FIGS. 1A, 1B, 1C and FIGS. 2A, 2B, 2C, show the basic geometric relationship of two extreme cases, each in three different positions;

FIG. 3, comprising FIGS. 3A, 3B, 3C, is a modified version of the extreme case of FIG. 2 in three different positions;

FIG. 4 illustrates an escapement mechanism with an internal actuator;

FIG. 5, comprising FIGS. 5A, 5B, shows a similar escapement mechanism in front and top views using an external actuator;

FIG. 6, comprising FIGS. 6A, 6B, illustrates a practical application of FG. 3 in two different positions;

FIGS. 7 and 8 show two slightly different applications of FIG. 3 using an internal actuator;

FIG. 9, comprising FIGS. 9A, 9B, illustrates the principle of FIG. 1 as a 120°–0° indexing drive in front and side views;

FIG. 10 shows the principle of FIG. 2 as a 60°–60° indexing drive with an internal actuator;

FIG. 11, comprising FIGS. 11A, 11B, 11C, demonstrates another application of FIG. 2 as a 60°–60° indexing drive with an external actuator and FIG. 12 shows the application of the principle of FIG. 1 to act as a dispenser mechanism requiring both the indexing and escapement characteristic.

BASIC GEOMETRIC PRINCIPLE

As mentioned before, the invention is based on a relationship of two moving parts which have closely defined geometrical shapes and which possess a motion translation characteristic known as a positive translation mechanism or in simpler terms this means that one of the members cannot move without the motion of the other. Referring now to FIGS. 1, 2 and 3, an identical triangle ABC is shown in three different moving positions in all three basic versions. It has a centerpoint or point of rotation E and a concentric circle D passing through vertexes ABC is shown only for illustrative purposes.

FIG. 1 also shows a pivoting member P which is a 120° segment with a pivot point F on a line of symmetry S and coinciding with the vertex C, while the vertex A is shown on line S. If now the vertex A is restricted to stay in line S and the segment P is pivoted in a clockwise direction, points B and C will follow the radial lines of segment P. This will establish a moving connection between the triangle ABC and segment P which is guided by points B and C staying in contact with radial lines of sagment P. Point A will stay on line S but it will leave the contact of the curved part of segment P, being furthest in midposition (FIG. 1-B) and coming in contact again in the other extreme position (FIG. 1-C). Now points A and C are in contact with the curve of segment P and point B is coinciding with pivotpoint F. This means that if the restriction of point A is broken, segment P can be pivoted back 60° to position 1-A while keeping triangle ABC locked throughout the return stroke of segment P. Consequently the segment P provides a positive motion translation between the pivoting member P and the rotating member ABC which in applied form can be used as an indexing drive or an escapement as described later.

While FIG. 1 is showing one extreme case where the pivot point F is lining up with one of the triangle vertexes, FIG. 2 is showing another extreme case where the point F is an infinite distance apart from center E. In actual terms this means that the line S will have a parallel motion and the pivoting member P will move on a straight line M perpendicular to line S. This resembles the special case of a rack in gear technology. Restricting again the point A to stay on line S and moving line S to the right a distance equalling the radius R, the position in FIG. 2-C will be reached where the triangle ABC was rotated 60° in a clockwise direction. A switching of the restriction from point A to point B on line S and a movement of the line S back to the initial position as in FIG. 1-A will translate the back stroke of member P to another 60° rotation of the triangle ABC.

The shape of member P in FIG. 2 is composed of four identical arcs which are scribed by two of the triangle vertexes opposite to the one which is restricted to stay on line S. The radius of the arcs equals about the longer dimension of the shape P. As described later, the arrangement finds practical applications for escapement mechanisms or for indexing drives where a full oscillation of member P is translated to a 120° rotation, 60° per each stroke.

FIGS. 1 and 2 can be considered the extremes of an endless variety of cases where the pivot point will be somewhere between the extreme cases of FIGS. 1 and 2. In FIG. 1 the point F is coinciding with one of the vertexes while in FIG. 2 it is an infinite distance away from center E. In FIG. 1 the total 120° advancement of the triangle ABC is completed within one stroke or during half of the oscillation of the member P and the return stroke will have a 0 advancement. In FIG. 2 each half of the oscillation will advance the triangle 60° with the same total of 120°. Selecting now the pivot point F to be somewhere between the extreme cases of FIGS. 1 and 2 means that the total advancement of the triangle ABC is still 120° per a full oscillation of member P but the proportion is between the extremes of 120°–0° and 60°–60°. As will be described later, FIG. 4 is showing a 30°–90° proportion, for instance.

The same rule for scribing the shapes P by two of the triangle points can still be applied here. The shapes will be symmetrical again but only about line S. Only the extreme case of FIG. 2 has a symmetry about both of its perpendicular axis. The "inbetween cases" resemble the wellknown quick return mechanisms where a crankpin or arm is used to drive a pivoting oscillating arm with different than half-half proportion.

FIG. 3 is illustrating a modified basic case of FIG. 2 where the pivot point F of member P can be considered again an infinite distance apart but with the provision that member P has a small moving freedom along the line S. In practical terms this means that member P will have a double moving freedom: a motion limited to the radius of circle D and a smaller perpendicular moving freedom along the line S. The shape P will be scribed again by two of the vertex points B and C if point A in FIG. 3-A is pivotally secured to line S. Shape P is symmetrical about both centerlines and is formed actually by two identical arcs whose radii are equalling the side of the triangle ABC which is same as one side of the shape P in FIG. 1.

A comparison of FIGS. 1, 2 and 3 reveals that while the triangle ABC is same in all cases the shape P is different in each different basic case. Yet in all cases the extreme four points of shapes P are also identical. A study of the extreme positions (A and C) shows that the triangle ABC is on the right side of line S in position A and on the left side in position C. Consequently the vertexes of the two triangles are determining the overall size of the shapes P in all cases.

ESCAPEMENTS

A large variety of practical applications can be designed using the basic principles of FIGS. 1–3. There are two major groups: escapements and indexing drives. In escapement mechanisms an escapement wheel is usually power driven and its power is released incrementally only when an oscillating member is allowed to complete its oscillation. A most known case is the escapement in timekeeping devices where the oscillation of an escapement arm is timed by a pendulum or a balance wheel.

In the following practical application samples same letter references as in basic geometry (FIGS. 1–3) are used to best identify some of the typical functional components in applied form. FIG. 4 shows an escapement mechanism where pivot point F of a flat oscillating member 20 lies again on the line of symmetry S, a distance away from the center of rotation E of a disk 21 which carries the three pins A, B and C corresponding the vertexes of the equilateral triangle as described before. The oscillating member or actuator 20 has a shaped opening 23 corresponding the shape P for a case between the extremes of FIGS. 1 and 2. The well known technique of cam design can be applied here where the ins A, B and C can be considered as cam followers which determine the deviation of the internal actuator 23 as compared to the basic shape P in FIGS. 1–3 where the contour of shape P can be considered as the pitch line. That means the opening of actuator 23 is larger all the way around by an amount equalling the radius of the pins A, B and C plus a working clearance. Since the points restricted to stay on line S are leaving the contour of shape P, clearance notches 24 and 25 have to be added here. This is necessary only for internal actuators. In FIG. 4 the distance between centers E and F is selected to be as D × cos 75° wherein D is the circle through the centers of pins A, B and C. This leads to a case where line S has a 30° total moving freedom and the distance BF equals the radius of circle D. In terms of an escapement, the proportion means that the wheel 21 can complete a 30° rotation in a clockwise direction while the escapement arm or actuator 20 is swinging also 30° to the right, letting the pin B to enter the notch 24 thereby. During return stroke, the pin C and notch 25 stay in alignment and wheel 21 can complete a 90° rotation also in a clockwise direction.

Thus the selected center distance EF gives a 30°–90° escapement which can give an unequal powering to pendulum or balance wheel if the case is used in a timing control where a pendulum weight is added to the extension of line S. Of course any other proportion could be used here by selecting a different center distance EF as was explained for basic geometry.

FIG. 5 is illustrating a similar escapement mechanism with an external actuator 26 and showing more detail. Here the wheel center E and pivot F are shown to be supported by a baseplate 27 which has a notch 28 to act as a stop for a pin 29 of an escapement arm 30 which is joining the actuator 26 to pivot point F and also supports a light operating arm 31. An escapement wheel 32 is carrying the pins A, B and C which can clear the escapement arm 30. Wheel 32 has a groove 33 for a cable 34 and a weight 35 which are shown to illustrate a counterclockwise powered rotation to the wheel 32 only. The actuator 26 is also shown massive, so gravity can keep it in the position shown in FIG. 5-A, preventing the rotation of wheel 32. Striking the arm 31 with a light force, such as a falling coin, will raise the acuator 26 and enable a small motion to wheel 32. During return stroke of arm 31 the escapement wheel 32 can move a larger angular distance until it will be stopped by the pin B. The total escapement per oscillation of arm 31 is again 120° and the escapement ratio will be determined again by the distance EF. If point A and pivot point F were lined up as in FIG. 1, no escapement will take place during downward stroke of arm 31 and a 120° escapement step takes place during the return stroke of arm 31.

The cases of FIGS. 4 and 5 are based on the same basic shape P. The difference is that FIG. 4 is an internal and FIG. 5 an external shape. In FIG. 4 the escapement arm 20 can be a very thin part from any material making the mechanism very suitable for thin applications. The arrangement in FIG. 5 requires more thickness but the actuator shape 26 is smaller.

Any basic shape as shown in FIGS. 1–3 can function as an escapement in either direction. Since most escapements are unidirectional, the shape P could be modified because only the two diagonally opposing curves are acting as escapement surfaces. An escapement based on FIG. 1 can be considered a positive lock escapement while the ones based on FIG. 2 or on some of the "inbetween cases" can be also rotated in the opposite direction for some reset applications if the escapement arm has its oscillation freedom.

INDEXING DRIVES

Any basic shape of FIGS. 1–3 can be also used as a 120° indexing drive which simultaneously contains the escapement characteristics as just described. The discussion of the basic motion translation principles demonstrated that a restriction of one of the vertexes of the triangle ABC is necessary to transmit the motion of line S to a rotary motion of the triangle ABC. In practical terms this means that any known drive method employed in ratchet drives can be applied here to accomplish the required results. The drive pawl or some equivalent is always necessary while the backup pawl could be eliminated in some cases. The following six indexing methods (FIGS. 6–11) are illustrating the most common applications of FIGS. 1–3, some having more detail shown than the others.

FIG. 9 illustrates the application of FIG. 1 using an external segment 40, surrounded by pins ABC. A U-shape base 41 is shown which supports the rotatable mount E of a wheel 42 and the point F of an arm 43 which is fastened to the segment 40. Arm 43 further supports a gravity operated (or spring) pawl 44 pivotally supported at 45. A backup pawl 46 is pivotally mounted to base 41 using a pivot stud 47. An extension spring 48 keeps the end of pawl 46 next to pin C, preventing a counterclockwise rotation to the wheel 42. A hole 50 and a stop pin 51, secured to base 41 are shown to limit the motion of pawl 46.

In position, shown in FIG. 9-A, the pawl 44 restricts pin A to stay on line S. Pivoting now the arm 43 to the right will transmit the 60° motion of the arm 43 to a 120° rotary motion of wheel 42 while pin B will prevent the escapement of segment 40 or in other words it is maintaining a positive connection between arm 43 and wheel 42. Pawl 44 could have a special end 52 to match the pin A. An analyses of the mechanism will show that the power is transmitted through a low friction four-bar linkage in which FE acts as a base ine and EA, pawl 44 and arm 43 are the three moving links while the segment 40 merely acts as an escapement preventing member. Same drive can be also designed with an internal segment using the techniques of FIG. 4 with ratcheting pawls as just described.

FIGS. 10 and 11 are an internal and external application of the basic principle of FIG. 2 with infinitely long pivot arm. In FIG. 10 the shape P is an internal opening 60 of an actuator 61 which is guided to have a horizontal motion by means of two bentover portions 62 and 63, bent from the stock of the actuator 61 and riding on top of a wheel 64. An extension 59, shown to be broken off, could be used to act as another guide and means to connect it to any suitable power source (not shown). Actuator 61 has two pawls 65 and 66 pivotally secured at 67 and 68 to actuator 61. A spring 69 is holding both pawls 65 and 66 against a stop 70 which is lanced out from the stock of actuator 61, providing a clearance opening 71 for the spring 69 thereby.

Pins A and C are shown to be on line S which also acts as a centerline for two notches 72 and 73 to provide a working clearance for pins A, B and C. When the actuator 61 is moved to the right, pawl 66 will start to rotate wheel 64 in a counter-clockwise direction. The rotation will be aided by the notch and pin contact which has its deepest engagement in midposition of the operating stroke. A motion of the actuator 61, equalling the radius of the pincircle, will advance the wheel 64 60°. At the end of this motion pin B will reach line S and pawl 65 will restrict pin B to stay on line S causing a switchover of driving side. During the return of actuator 61 another 60° advancement of wheel 64 will be completed amounting to a 120° rotation of wheel 64 during a full oscillation of actuator 61.

FIG. 11 illustrates same basic principle (FIG. 2) using an external actuator 75 and a different ratcheting and guiding method. The center E of a wheel or drum 76 is used to act as a guide for a slot 77 of the actuator 75 and the headed portion 78 of the center E acts as a retainer to the actuator 75 keeping it close to drum 76. Pins A, B and C are slidably mounted parallel to center axes E. A spring 80 and a retainer 81 hold them in a driving position (FIG. 11-C), but they can be cammed in by cam surfaces 82 and 83 of the actuator 75. In FIG. 11-A pin A is restricted to stay on line S by ear 82 and while the actuator 75 is pulled to the right, pin A will drive the drum 76 60°. On the end of this stroke pin B will be forced in by the cam surface of ear 83 until it can snap free and establish the contact with line S. During the return stroke another 60° rotation will be transmitted to drum 76 in same manner as described for FIG. 10.

The application of the basic principle of FIG. 3 is illustrated in three different variations in FIGS. 6, 7 and 8. Spring loaded ratcheting means as previously described could be also used here for this special case but all the variations are illustrating a method which takes advantage of the required vertical moving freedom of the shape P.

In FIG. 6 the shape P is shown as an external actuator 85 which could have any suitable connection to an operating arm or a power source. The method shown in FIG. 7 could be applied here. Actuator 85 is surrounded by pins A, B and C which are part of a driven wheel 86 rotating on center E. A comparison of shape P in FIG. 3 and actuator 85 in FIG. 6 shows them to be about same size and two driving notches 87 and 88 are acting here as the pin allowance. In an initial position, FIG. 6-A, pin C is in notch 88 and on line S while pin A is on the right side of line S. Cam surfaces 89 and 90 are used to accomplish the required switchover of driving point from one side of the horizontal centerline to another. This requires an extra initial driving distance before the connection of the actuator 85 is made with the driven pin. FIG. 6-A shows an initial position of actuator 85 in full lines and a position after switchover in dotted lines, showing also a new position of line S. If wheel 86 is prevented to rotate in a counterclockwise direction and actuator 85 is pulled to the right, cam surface 90, acting on pin C will raise actuator 85 and establish a connection between notch 87 and pin A and a further motion of actuator 85 will start the rotation of wheel 86 in a clockwise direction.

FIG. 6-B shows a midposition where pins C and B positively maintain the connection of pin A and notch 87. The difference of line S and $S_1$ is added to the driving stroke of actuator 85 which equals again the radius of pin circle. This extra distance is determined by the selection of cam slopes 89 and 90 which are used to accomplish the switchover of driving side as explained before. This also adds a small extra distance to the vertical moving freedom of the actuator 85.

FIG. 7 shows a similar application of FIG. 3 where the shape P is an internal opening of an actuator 91 which is shown pivotally connected at 92 to an actuating lever 93, having a pivot point on a base at 94. Pins A, B and C are again part of a wheel 95 which has six equally spaced notches 96 for a backup pawl 97, pivoting at 98 and shown gravity operated. The internal shape of the actuator 91 has extra clearance 99 and 100 because of the required extra distance for switchover as explained for FIG. 6. The wheel 95 is prevented to rotate clockwise by pawl 97. As the lever 93 is moved to the right, a cam surface 101 acting on pin A, is causing the actuator 91 to raise and establish a contact between pin C and notch 102. A further motion of arm 93 will rotate the wheel 91 60° in a counterclockwise direction allowing pawl 97 to drop to the next ratchet notch 96 of wheel 95. During return stroke of arm 93 the wheel 95 will be driven another 60° by pin B.

FIG. 8 is showing a modified version of FIG. 7. The difference here is that instead of wheel 95 a rotating member 105 is used which has three rounded tips A, B and C instead of pins as previously shown. The actuator 91 has also extra clearances 106 and 107 to clear this new shape. The arrangement is very suitable for applications where the overall thickness has to be small.

APPLICATION FOR A DISPENSER

FIG. 12 is illustrating an application for a dispenser where a positive indexing action is required. It is a wellknown arrangement where cylindrical shapes 110 are allowed to roll down an inclined pline or chute 111. The dispensing mechanism is using a turnstile-like three lobed starwheel 112 which can hold the lowermost can 110 and which is shaped to allow the cans roll down if the rotation of it is not prevented. The mechanism is employing the version shown in FIG. 9 where a 120° indexing is given during one stroke of the operating arm 43. (Some of the reference numerals here are same as in FIG. 9). A bracket 113 is used to provide a rotatable support at E to starwheel 112 and to the pivot point F of the arm 43. The mechanism is tied to the chute 111 and consequently the starwheel 112 will hold the lowermost can 110. This positive hold is provided by pin A which is a part of starwheel 112 and which is resting against segment 40. A full 60° swing of arm 43 in a clockwise direction is required before starwheel 112 is freed. Pawl 44 is then picking up pin B and a counterclockwise pivoting of arm 43 will start the rotation of starwheel 112 in a counterclockwise direction. Arm 43 first has to be powered to overcome the holding friction but after a short motion the rolling cans start to move the starwheel 112 and transmit the motion to the arm 43. On the end of the stroke, pin B will reach the position of pin A as shown in FIG. 12 and by that time the lowermost can 110 is in the position shown in dotted lines ready to roll or drop further to a desired location. No backup pawl (46 in FIG. 9) is necessary for the mechanism because cans 110 will prevent any backward motion to starwheel 112. A bentover portion 114 of chute 111 could be used to prevent any possibility of cans 110 overriding the starwheel 112.

The dispenser can be designed to dispense any cylindrical product which can roll on an inclined plane. Provided with a selection and coin control it can be used in vending machines for dispensing canned food or bottled drinks. A method of using the dispenser in a coin controlled vending machine is described in my patent application Ser. No. 582,181.

SUMMARY

The foregoing illustrated a variety of practical applications of the three basic geometric relationships of FIGS. 1–3. Any of them could be used as an internal or external escapement or indexing mechanism. A number of other combinations could be derived from these most typical practical variations.

Since most of the escapements and indexing drives are unidirectional, the shape of actuators could be modified by simplifying some nonactive sections. All the escapement and indexing drives of this invention are limited only to a 120° motion per a full oscillation of the actuator. For other indexing or escapement increments gear reduction or speedup can be used where the positive characteristic of the mechanism will be maintained. With a three times speedup ratio, for instance, a full revolution indexing or escapement is obtained. With reduction gearing the 120° increment could be reduced to any smaller increment. For precision drives the wellknown techniques of cam design, using a precision ground actuator shape and cam follower rollers instead of pins A, B and C, could be applied here.

The positive drive characteristic of the invention could be compared with the wellknown Geneva drive. While the precision class could be same for both of them, the important difference here is that any straight line or oscillating actuator such as electrical, pneumatic, hydraulic or manual actuators can operate my new indexing mechanism, but Geneva drives are limited only to rotary power drives.

Only the most typical applications were illustrated and described. It is obvious that these principles could be used in many different combinations and sizes for the applications which in escapement group include timing controls, coin or item counting devices, oscillating speed control mechanisms etc. The positive indexing drives have a still wider use in automatic machinery field, counting mechanisms, incremental switching and servo controls and in the control and drive of various dispensing mechanisms which especially in vending industry can simplify and economize some of the existing mechanisms.

The scope of the applications of the three basic principles of this invention in any combination is limited only by the imagination of the designers. It is the intention, therefore, to be limited only by the following claims.

What I claim is:

1. A motion translating device having a rotating member and a pivoting member working next to each other on same plane, said rotating member having a center of rotation and three acting points equally spaced on a circle concentric to said center of rotation, said pivoting member having an arm with a pivot point not coinciding with said center of rotation, said pivoting member having a line of symmetry passing through said pivot point and having an equal moving freedom to either side of said center of rotation with a total moving freedom equalling the radius of said circle, said pivoting member having a shape generated by two of said acting points when the third of said point is restricted to stay on said line of symmetry and said pivoting member is oscillating within said moving freedom, said two acting points following the contour of said generated shape and maintaining a positive translation of motions between said rotating and pivoting member in either direction during said oscillation.

2. A motion translating device according to claim 1 wherein said pivot point is coinciding with one of said acting points, said generated shape being a 120° segment with a radius equalling the side of an equilateral triangle formed by said three acting points and said translation of motions translating one half of said oscillation to a 120° rotation and the other half to a 0° rotation of said rotating member.

3. A motion translating device according to claim 1 wherein said pivot point being a infinite distance apart from said center of rotation, said generated shape being formed by four identical arcs forming a shape double symmetrical about said line of symmetry and a line perpendicular to it, said translation of motions translating each half of said oscillation to a 60° rotation of said rotating member.

4. A motion translating device according to claim 1 wherein said pivot point being anywhere between a distance infinitely long and a location coinciding with one of said acting points, said translation of motions translating said full oscillation to a 120° rotation of said rotating member wherein each half of said oscillation having a different translation degree determined by the location of said pivot point.

5. A motion translating device according to claim 1 wherein said three acting points being three pins surrounding said generated shape and two of said pins in contact with said generated shape maintaining said positive translation of motions while causing said third pin to stay on said centerline of symmetry throughout said moving freedom.

6. A motion translating device according to claim 5 wherein said rotating member possessing rotational energy in one or the other direction, said pins acting successively against said generated shape to restrict the rotation of said rotating member and a full oscillation of said generated shape letting said rotating member to escape 120° per each full oscillation in one or the other direction.

7. A motion translating device according to claim 5 wherein said pivoting member being power oscillated within said moving freedom, said pivoting member having means to restrict one of said pins to stay on said line of symmetry alternately on either side of said center of rotation, said restriction being unidirectional and determining the direction of rotation of said rotating member when said pivoting member is oscillated within said moving freedom, said pivoting member advancing said rotating member 120° per each full oscillation of it.

8. A motion translating device according to claim 5 wherein said three pins being retractable parallel to said axis of rotation, said generated shape having two ears to maintain one of said pins on said line of symmetry in one direction, said ears having a cam surface capable of overriding said pins in the other direction, said ears, cam surfaces and retractable pins providing ratcheting means to keep said pins on said line of symmetry alternately on either side of said center of rotation when said generated shape is oscillating within said moving freedom, said full oscillation advancing said rotating member 120° in a direction determined by said driving ears and cam surfaces.

9. A motion translating device according to claim 5 wherein said generated shape having two notches on said line of symmetry suited to said pins for driving said rotating member in one direction, said notches having a cam surface for disengagement in the other direction when said rotating member is prevented to rotate in the opposite direction, said generated shape maintaining a working contact with two of said pins when the third of said pins is in one of said notches, said generated shape having another small moving freedom perpendicular to said oscillation, said cam surfaces providing a switchover on the beginning of each said oscillation half from one driving side of said rotating member to another, said switchover requiring an extra small distance added to said oscillation, said switchover and said driving connection providing a ratcheting drive to said rotating member wherein each of said full oscillation is advancing said rotating member 120° in one direction.

10. A motion translating device according to claim 5 wherein said three pins driving a 120° dispensing wheel, said dispensing wheel holding a number of solid items guided and fed against said dispensing wheel, said dispensing wheel being shaped to release one of said items for every 120° rotation of it, said generated shape being a 120° segment provided with ratcheting means to restrict one of said pins to stay on said line of symmetry, one of said pins against the curved part of said segment providing a positive hold for said dispenser wheel throughout half of said oscillation, said ratcheting means initiating the rotation of said dispensing wheel for driving it throughout the other half of said oscillation, said translation of motions providing a positive 120° rotation to said dispensing wheel.

11. A motion translating device according to claim 1 wherein said three acting points being three pins surrounded by said generated shape, two of said pins in contact with said generated shape maintaining said positive translation of motions and causing said third pin to move into clearance notches in said generated shape and stay on said centerline of symmetry throughout said moving freedom.

12. A motion translating device according to claim 11 wherein said rotating member possessing rotational energy in one or the other direction, said pins acting successively against said generated shape to restrict the rotation of said rotating member and a full oscillation of said generated shape letting said rotating member to escape 120° per each full oscillation in one or the other direction.

13. A motion translating device according to claim 11 wherein said three pins being modified to three rounded tips of said rotating member, said rotating member possessing rotational energy in one or the other direction, said tips acting successively against said generated shape to restrict the rotation of said rotating member and a full oscillation of said generated shape letting said rotating member to escape 120° per each full oscillation in one or the other direction.

14. A motion translating device according to claim 11 wherein said pivoting member being power oscillated within said moving freedom, said pivoting member having means to restrict one of said pins to stay on said line of symmetry alternately on either side of said center of rotation, said restriction being unidirectional and determining the direction of rotation of said rotating member when said pivoting member is oscillated within said moving freedom, said pivoting member advancing said rotating member 120° per each full oscillation of it.

15. A motion translating device according to claim 11 wherein said three pins being modified to three rounded tips of said rotating member, said pivoting member being power oscillated within said moving freedom, said pivoting member having means to restrict one of said tips to stay on said line of symmetry on one or the other side of said center of rotation, said restriction being unidirectional and determining the direction of rotation of said rotating member when said pivoting member is oscillated within said moving freedom, said pivoting member advancing said rotating member 120° per each full oscillation of it.

16. A motion translating device according to claim 11 wherein said three pins being modified to three tips of said rotating member, said generated shape having two notches on said line of symmetry suited to said tips for driving said rotating member in one direction, said notches having a cam surface for disengagement in the other direction when said rotating member is prevented to rotate in one direction, said generated shape maintaining a contact with two of said tips when the third of said tips is in one of said notches, said generated shape having another small moving freedom perpendicular to said oscillation, said cam surfaces providing a switchover on the beginning of each said oscillation half from one driving side of said rotating member to another, said switchover requiring an extra small distance added to said oscillation, said switchover and driving connection providing an indexing drive to said rotating member wherein each of said full oscillation is advancing said rotating member 120° in one direction.

* * * * *